Patented June 3, 1924.

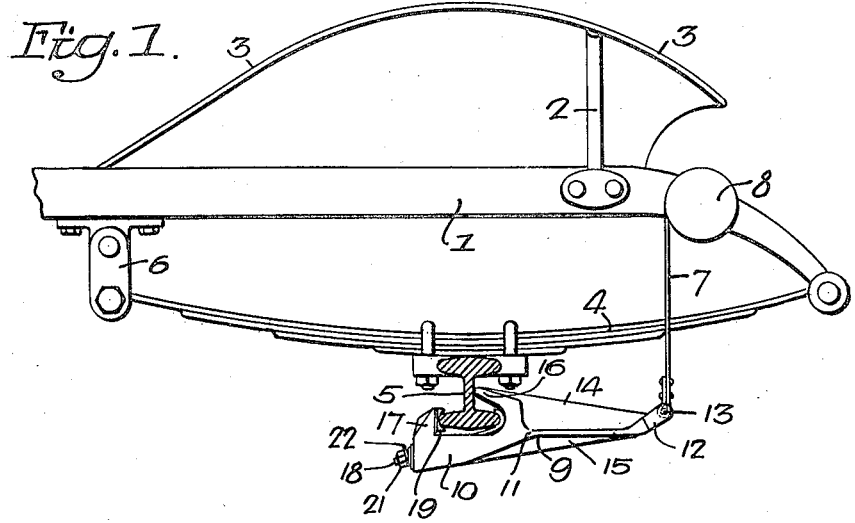
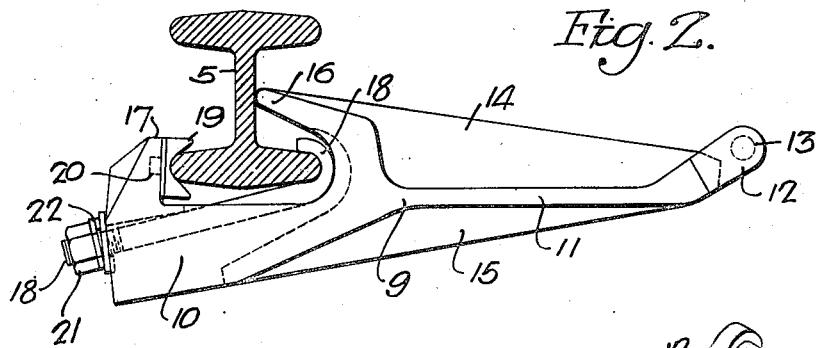
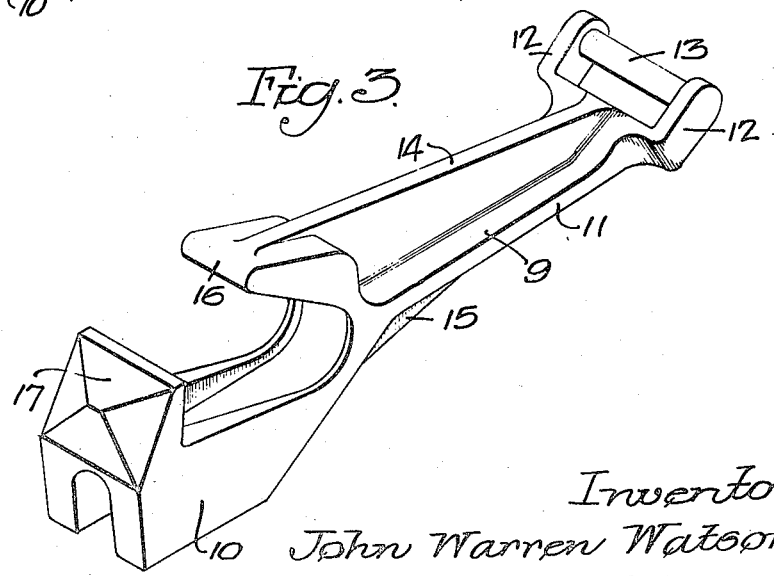

1,496,694

UNITED STATES PATENT OFFICE.

JOHN WARREN WATSON, OF WAYNE, PENNSYLVANIA.

BEAM BRACKET.

Application filed July 16, 1920. Serial No. 396,798.

*To all whom it may concern:*

Be it known that I, JOHN WARREN WATSON, a citizen of the United States, residing in Wayne, Pennsylvania, have invented Beam Brackets, of which the following is a specification.

This invention relates to certain improvements in the construction of brackets or arms especially designed for attachment to structures, such as rolled sections or equivalent supporting members, and has more especially to do with improved means for connecting the bracket to such members and for providing a support for the bracket in addition to the connecting means.

One object of the invention is to provide a novel form of connection between a bracket or equivalent structure and a beam, which shall engage the latter at three points.

Another object of the invention is to provide a connecting member possessing the above characteristics which shall also require or include but a single adjustable element necessitating manipulation when said bracket is applied or removed;—the arrangement and disposal of the parts being particularly adapted to permit of the adequate support of a given load at a relatively great distance from the beam with a minimum deflection for a given weight of material in the bracket.

It is further desired to provide a novel form of bracket having one end especially designed for attachment to a support and its other end for the reception of a load acting at a relatively great distance from said support, the shape of the bracket and the disposition of the metal therein being particularly designed to provide a maximum of stiffness and rigidity for a given weight.

Another object of the invention is to provide a novel form of bracket or arm whose design shall be of such a nature as to especially fit it for transmitting a load, such as that due to or applied by a recoil checking device for the springs of a motor vehicle, to the axle of such vehicle,—the invention especially contemplating a novel arrangement of parts providing a three-point contact between said bracket and the axle.

Another object of the invention is to provide a bracket or arm of the above class which shall require or include but a single adjustable element for bringing and maintaining all its contact elements into operative engagement with said axle.

The invention further contemplates a beam bracket of the general type above described which shall be adapted for use with, and connection to, beams of various and widely differing dimensions and also with beams whose flanges are inclined or extended in other than straight lines.

I also desire to provide a beam bracket which shall include novel means for connecting it to, and supporting it in cooperative relation with, a structure such as an I-beam or T-beam, including the elements for engaging flange edges of said beam and an element formed to engage the web thereof; the invention in certain of its forms including a single operative member for setting up or bringing all of said other elements into their operative positions.

These objects and other advantageous ends I obtain as hereinafter set forth, reference being had to the accompanying drawings, in which, Fig. 1 is a side elevation illustrating my invention as applied between the axle of a motor vehicle and a recoil check, Fig. 2 is an enlarged elevation further illustrating the invention; and Fig. 3 is a perspective view of a preferred form of my beam bracket.

Referring to Fig. 1, 1 represents one end of one of the side members of a motor vehicle frame, from which an arm 2 extends upwardly for the support of a mud or wheel guard 3. A semi-elliptic spring 4 is supported on the axle 5 and at one end is directly connected to the forward extremity of the frame member 1, while its other end is connected to said frame member through customary shackle means 6.

For the sake of illustration I have shown my invention as utilized for operatively connecting a recoil checking device 8 to the axle 5,—in the present case, through a flexible band 7. With the recoil checking device so positioned with relation to the axle, a relatively long, stiff member is required in order to hold the free end of the band 7 in such position relatively to the recoil checking device, as to permit said band to operate in a substantially vertical line as the axle is caused to approach or move away from the frame member 1.

The bracket whereby this end is accomplished consists of a metal arm 9 in the form of a casting or forging, having a cored head portion 10, a body portion 11, and a load-engaging portion 12 at that end of said body portion distant from the head 10.

For the sake of illustration I have shown said load-supporting end as forked and having its branches connected by a bar 13 to which, in the present case, the free end of the band 7 is connected, but it is to be understood that the form and construction of said end is immaterial, so long as it may support or be connected with, the load to be carried. Between the head 10 and the end 12, a web 14 extends upwardly from the body 11 in and adjacent the median vertical plane of the bracket, and a similar lower web 15 projects downwardly from said body in such manner that, with the upper web, it imparts rigidity to the bracket and stiffens it against the vertically acting load applied to its end 12. The body itself co-acts with said webs to stiffen the bracket laterally.

The head 10 is recessed from its upper or top side and has an extended portion 16 overhanging said recess in position to engage the web of the beam 5 when one edge of the bottom flange of said beam is engaged by the slightly overhung portion 17. The opposite edge of said lower flange is supported or held by the head of a hooked bolt 18 which extends through the hollow or cored portion of the head to the outer face thereof. In the present case I have shown a notched block 19 provided with a cylindrical extension 20, whereby it is rotatably supported in the overhung portion 17 and interposed between the latter and the adjacent lower flange of the axle 5. In some instances, however, this notched block may be omitted and said flange be directly engaged with said portion 17, which, in such case, may be suitably formed to meet the requirements of any particular application without departing from my invention.

The web engaging edge of the extension 16 is preferably curved or rounded and the hooked bolt 18 has mounted on its outer end a nut 21 and some device such as a lock washer 22 whereby said nut is held in place after being set up.

From the above-described arrangement of parts, it is obvious that my bracket may be quickly and rigidly attached to or mounted upon a beam, such as an axle 5, in a minimum of time, for with the nut 21 properly slacked off, it is possible to apply the block 19 and the hooked end of the bolt 18 to the lower flanges of said beam so that the extension 16 engages or terminates adjacent the web of the beam. As the nut 21 is thereafter set up, the bracket is moved in such manner that the block 19 is caused to engage the adjacent flange of the beam 5 and thereafter is swung upwardly about said block as a fulcrum until the edge of its extension 16 strikes the web of said beam. The final tightening of the nut thereupon rigidly connects the bracket to the beam by a three-point contact which, for a given weight of metal in the bracket, imparts to it the required stiffness both vertically and laterally.

It is especially to be noted that the above described operation of connecting the bracket and the beam is accomplished merely by the setting up of the single adjustable element of the combination, to wit,—the nut 21 on the bolt 18, which with the extension 16 and block 19, or in its absence the hooked portion 17, serves to so connect the bracket to the beam that it is clamped to the lower flange thereof and pressed against the abutment provided by its web.

Moreover, it is to be noted that the hooked bolt 18 is threaded for a relatively great portion of its length so that the device is adapted for connection to beams of widely varying dimensions of web and flange. If the edge of the flange engaged by the block 19, instead of being straight, should be bent or inclined to the general plane of the bracket, it is obvious that said block may turn on its pivot 20 so that its grooved face may accommodate itself to the position of said edge. Further, if the edge of the flange engaged by the hooked bolt 18, instead of being straight, should be bent or inclined to the general plane of the bracket, it is obvious that said hook may be turned to permit its groove to accommodate itself to the position of said edge. As above noted, where there is no necessity for the bracket to thus accommodate itself,—the said block may be omitted.

Owing to the provision of this combined clamp and brace construction, the body 11 with its webs 14 and 15 may be made of relatively great length without sacrificing the stiffness of the bracket so that when the latter is employed as part of the combination shown in Fig. 1, its bending or yielding under the action of the load applied by the recoil checking device 8 through the band 7, is negligible. In the case illustrated, it is possible, by the use of my bracket, to mount said device 8 on a portion of the frame 1, where it will not interfere with the structures associated with the steering gear, springs, mud guards, etc. and still connect its band to the axle in such a manner as will permit of its functioning with the maximum effectiveness under operating conditions.

While I have illustrated and described a preferred form of construction for carrying my invention into effect, this is capable of variations and modifications without departing from the spirit of the invention which primarily consists of a bracket embodying means for clamping it to a beam, and bracing means for distributing the stresses. I, therefore, do not wish to be limited to the precise details of construction set forth, but desire to avail myself of such variations and modifications as come within the scope of the appended claims.

I claim:—

1. The combination of a bracket having a portion formed to engage the lower flange of a beam, and another portion formed to engage said beam at a point above said flange, with an adjustable member operative on said beam for swinging the bracket about one of said portions to bring the other into engagement with the beam.

2. The combination of a bracket having two portions formed to respectively engage a beam on opposite sides of a line drawn through the center of the web of such beam, with an adjustable member operative on said beam for swinging the bracket about one of said portions to bring the other into engagement with the beam.

3. The combination of a bracket recessed to form two projections for respectively engaging opposite sides of a beam; with an adjustable bolt structurally independent of said bracket and formed to engage the beam opposite one of its points of engagement by the bracket to hold the latter rigidly thereto.

4. The combination of a bracket having a recess forming a portion for engagement with the flange of a beam and a second portion for engagement with the web thereof; a hook bolt for engaging the flange of the beam opposite the portion engaged by said bracket; and means on said bolt, operative on the bracket for causing said two portions thereof to rigidly clamp the beam.

5. The combination of a bracket having a recessed head and an elongated body; with a single adjustable member extending into said head and cooperating with the opposite sides of the recess thereof to provide a three point beam-engaging clamp.

6. The combination with the axle of a motor vehicle and a recoil checking device including a flexible band, of a bracket having a three point clamping connection with the axle and operatively engaged by the band of said recoil checking device.

7. The combination with the axle of a motor vehicle and a recoil checking device, of a bracket having a three point clamping connection with the axle and operatively connected to said recoil checking device.

8. The combination of an axle having a web and a flange projecting in opposite directions from said web; a bracket recessed to provide a portion engaging the web of said axle and a second portion engaging the flange; a hook bolt also engaging the flange of the axle and including a nut operative to hold the bracket in clamping relation to said axle; with a recoil checking device including a member connected to the end of said bracket.

JOHN WARREN WATSON.